US009580122B2

(12) United States Patent
Doherty

(10) Patent No.: US 9,580,122 B2
(45) Date of Patent: Feb. 28, 2017

(54) WALKER FOR MOVING A STRUCTURE

(71) Applicant: Benjamin Daniel Doherty, Edmonton (CA)

(72) Inventor: Benjamin Daniel Doherty, Edmonton (CA)

( * ) Notice: Subject to any disclaimer, the term of this patent is extended or adjusted under 35 U.S.C. 154(b) by 31 days.

(21) Appl. No.: 14/708,884

(22) Filed: May 11, 2015

(65) Prior Publication Data
US 2016/0137115 A1 May 19, 2016

(30) Foreign Application Priority Data

Nov. 19, 2014 (GB) .................................. 1420579.3

(51) Int. Cl.
*B60P 1/02* (2006.01)
*B62D 57/02* (2006.01)
*B62D 57/032* (2006.01)

(52) U.S. Cl.
CPC .......... *B62D 57/032* (2013.01); *B62D 57/02* (2013.01)

(58) Field of Classification Search
CPC .......... B60P 1/02; B62D 57/02; B62D 57/032
USPC .................................... 180/7.1, 8.1
See application file for complete search history.

(56) References Cited

U.S. PATENT DOCUMENTS

| 3,576,225 | A | * | 4/1971 | Chambers | ................ | B65G 7/02 |
| | | | | | | 180/8.5 |
| 3,921,739 | A | | 11/1975 | Rich et al. | | |
| 5,921,336 | A | * | 7/1999 | Reed | ...................... | B62D 57/00 |
| | | | | | | 180/8.1 |
| 7,681,674 | B1 | | 3/2010 | Barnes et al. | | |
| 2013/0153309 | A1 | * | 6/2013 | Smith | .................... | B62D 57/02 |
| | | | | | | 180/8.1 |
| 2014/0262562 | A1 | * | 9/2014 | Eldib | ....................... | E21B 7/02 |
| | | | | | | 180/8.5 |

FOREIGN PATENT DOCUMENTS

| GB | 2166176 A | 4/1986 |
| WO | 2011135541 A2 | 11/2011 |
| WO | 2013123221 A1 | 8/2013 |

OTHER PUBLICATIONS

International Search Report issued in corresponding International Application No. PCT/CA2015/051103 dated Jan. 18, 2016 (5 pages).
Written Opinion issued in corresponding International Application No. PCT/CA2015/051103 dated Jan. 18, 2016 (3 pages).
Search Report issued in British Application No. GB1420579.3; Dated Mar. 20, 2015 (1 page).

* cited by examiner

*Primary Examiner* — Tony Winner
(74) *Attorney, Agent, or Firm* — Osha Liang LLP

(57) ABSTRACT

Described herein is a walker for moving a structure over the ground. The structure to be moved may be an oil and gas rig for instance. The walker includes a pontoon for engaging the ground, a jack with rollers disposed on the pontoon for lifting the structure and sitting on rollers, a longitudinal drive assembly for longitudinally moving the pontoon relative to the jack with or without the structure on the rollers, and lateral and rotational drive assemblies for moving the jack and the pontoon relative to the structure when the structure sits on the ground.

9 Claims, 3 Drawing Sheets

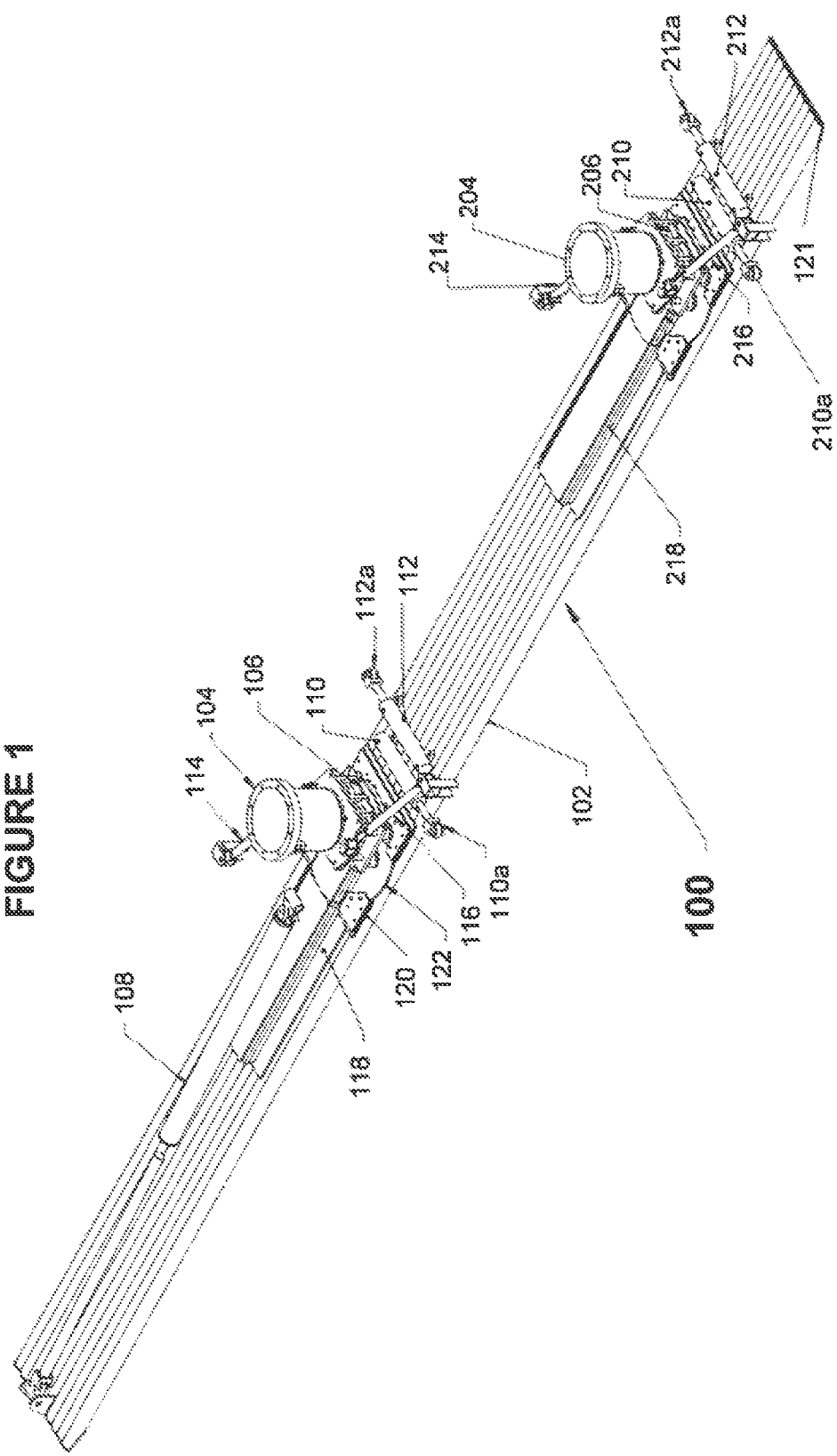

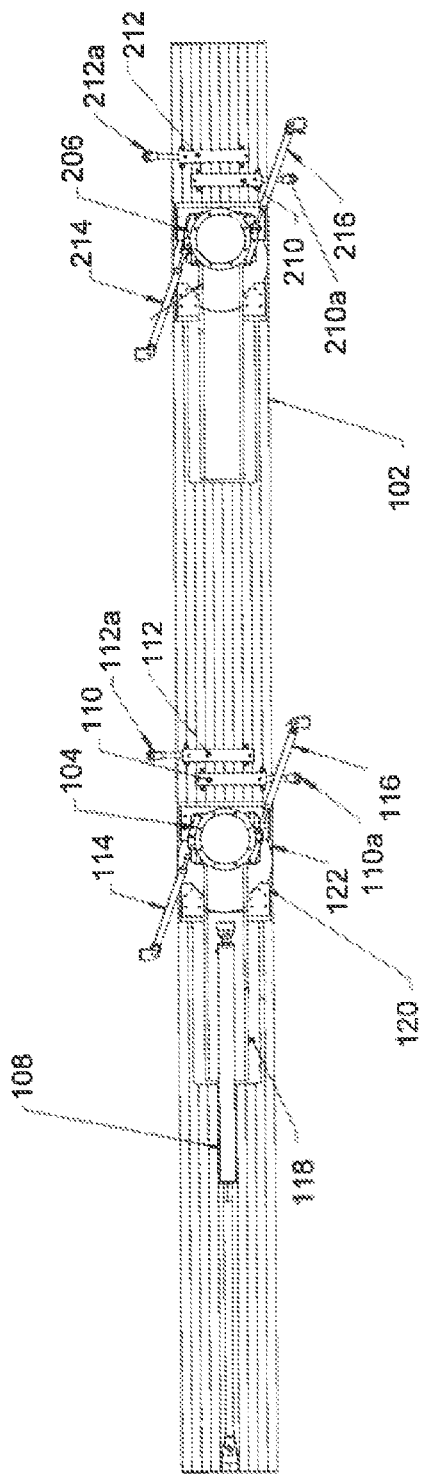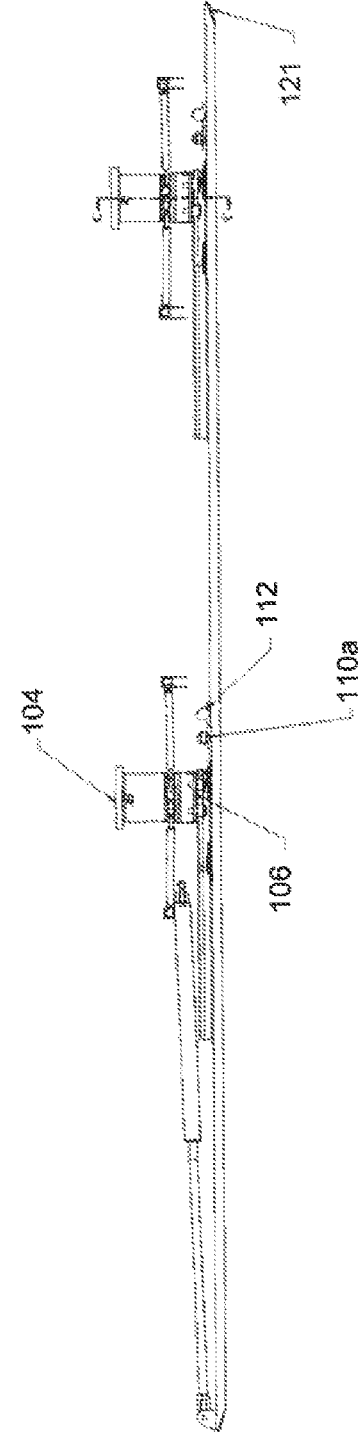

WALKER FOR MOVING A STRUCTURE

BACKGROUND

Field of the Disclosure

This disclosure relates generally to walkers for moving structures over the ground. Exemplary structures are oil and gas rigs.

Description of Related Art

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

Structures such as oil and gas rigs may be disassembled, transported, and then reassembled on an adjacent well. Often if disassembly is to be avoided, and the next hole is on the same location, the rig can be pulled onto the next hole by using winch trucks or bulldozers. This can be a time consuming, dangerous, and haphazard process. Walkers can eliminate the need for disassembly and reassembly by using hydraulics to lift and move a rig to its new drilling location.

Certain walkers use mechanisms called "stomp pads." These mechanical units operate independently from each other and are attached to the bottom of the structure being moved. The stomp pads are designed to carry the weight of the structure while advancing it in a particular direction. Because the surface area of each of these stomp pads is relatively small, high pressures are placed on the ground which can lead to ground cracking and sinkage, potentially destabilizing the entire structure.

Individual pads that operate independently from one another have other problems. One problem can occur when the structure needs to be moved in a different direction. Current "stomp pad" designs require manual adjustment of each individual stomp pad when a direction change is required. Manual adjustment can be time consuming and prone to error. Moreover, if the stomp pads are improperly aligned, high stresses may be placed on the joints of the walker and which could lead to damage of the walker or the structure itself.

In view of the aforementioned disadvantages, there is a need for an alternative walker.

SUMMARY

It is an object of the present disclosure to provide an alternative walker for moving a structure over the ground.

A walker for moving a structure over the ground is described herein. The structure may be an oil and gas well drilling rig. The walker includes a pontoon for engaging the ground, a jack with rollers disposed on the pontoon for lifting the structure and sitting on rollers, a longitudinal drive assembly for longitudinally moving the pontoon relative to the jack with or without the structure on the rollers, and lateral and rotational drive assemblies for moving the jack and the pontoon relative to the structure when the structure sits on the ground.

The foregoing has broadly outlined the features of the present disclosure so that the detailed description that follows may be better understood. Additional features will also be described herein.

BRIEF DESCRIPTION OF THE DRAWINGS

FIG. 1 is a perspective view of the walker.

FIG. 2 is a top view of the walker of FIG. 1;

FIG. 3 is a side view of the walker of FIG. 1;

Figure 4:
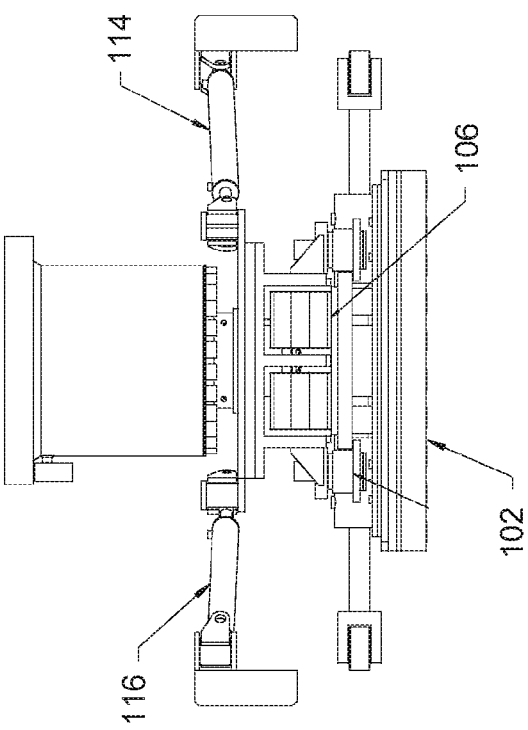
FIG. 4 is the front view of the walker of FIG. 1.
Figure 5:
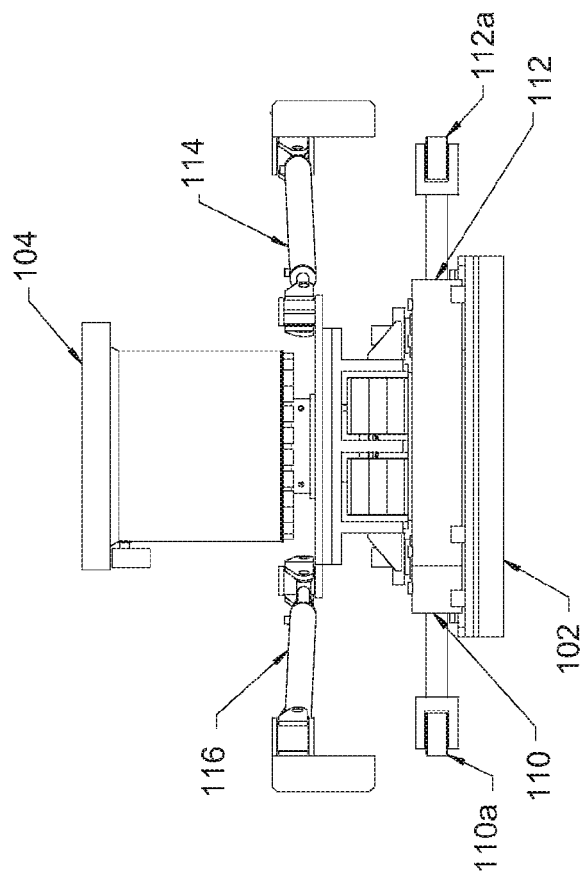
FIG. 5 is a cross-sectional view of the walker of FIG. 1 along line C-C of FIG. 3.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

These and other features, aspects and advantages of the disclosure will become apparent from the following description, appending claims and the accompanying drawings, which are briefly described below.

The term "structure" refers to a rig or another structure that may be moved by a walker. Other structures include, but are not limited to buildings, industrial equipment, earth moving equipment, aeronautical equipment and structures, mining equipment and structures, etc.

The term "longitudinal movement" refers to movement in a direction that is generally parallel to the length of the pontoon (102). The term "lateral movement" refers to movement that is parallel to the width of the pontoon (102). The term "rotational movement" refers to rotation in a plane defined by the pontoon (102), which also generally corresponds to the ground.

FIG. 1 illustrates a walker (100) comprising a pontoon (102) for engaging the ground, a jack (104) with rollers (106) disposed on the pontoon (102) for lifting the structure (not shown), a longitudinal drive assembly including a longitudinal drive member (108) for longitudinally moving the pontoon (102) relative to the jack (104) with or without the structure on the rollers (106), and lateral and rotational drive assemblies including lateral drive members (110 and 112) and rotational drive members (114 and 116) for moving the jack (104) and the pontoon (102) relative to the structure when the structure sits on the ground.

The term "pontoon" is used herein as a matter of convenience and is not intended to be specifically limited in shape. As described herein, the pontoon must be able to allow longitudinal movement of the jack and must be able to distribute the weight of the structure more widely than a leg or pad as used in certain prior walking systems.

The longitudinal drive assembly may comprise a longitudinal drive member (108) pivotally connected to the pontoon (102) and for pivotally connecting to the structure, for driving the longitudinal movement. The longitudinal drive member (108) may include a hydraulic cylinder as illustrated. The pivotal connections at either end of the longitudinal drive member (108) may allow for movement in the lateral direction and in the vertical direction.

The rollers (106) may comprise hardened steel cylinders linked together into a "chain" and a hardened steel roll plate. As the load moves forward the rollers roll with the load providing very low resistance. The rollers are suited for bearing the weight of the structure to be moved and may be such as those manufactured by Hilman Incorporated, Marlboro, N.J. 07746, U.S.A.

The longitudinal drive assembly may further comprise a longitudinal track (118) disposed on the pontoon (102), for guiding the longitudinal movement of the rollers (106).

The lateral drive assembly may comprise lateral drive members (110 and 112) connected to the pontoon (102), for pushing on the structure for driving the lateral movement. The lateral drive members (110 and 112) may each comprise rollers (110a and 112a) for contacting the structure to guide the longitudinal and rotational movement. The lateral drive members (110 and 112) may be cylindrical as illustrated.

The rotational drive assembly may comprise rotational drive members (114 and 116) pivotally connected to the jack (104), for pivotally connecting to the structure for driving the rotational movement. The rotational drive members (114 and 116) may be cylindrical as illustrated. The pivotal connections at either end of rotational drive members (114 and 116) may allow for movement in the lateral direction and in the vertical direction.

The rotational drive assembly may further comprise a retainer plate or plates (120) holding a circular rotational plate (122) carrying the jack (104) and rollers (106) for guiding the rotational movement tangent to a specified center of rotation.

The longitudinal, lateral, and rotational drive assemblies may be hydraulically driven and electronically controlled. Lighter applications may be driven using servos, electrically controlled power screws, ball screws, or other mechanical means.

The pontoon (102) may comprise at least one tapered edge (120) at a lateral side wall for preventing the pontoon from catching on the ground.

The walker (100) may further comprise a second jack (204) sitting on second rollers (206), a second track (218) a second lateral drive assembly including second lateral drive members (210 and 212), a second rotational drive assembly including second rotational drive members (214 and 216), each of which is disposed on the pontoon (102) longitudinally spaced from the first jack (104), for laterally and longitudinally moving the pontoon (102) and the jack (104 and 204) relative to the structure. The lateral drive members (210 and 212) may each comprise rollers (210a and 212a) for contacting the structure to guide the longitudinal and rotational movement. A second longitudinal drive assembly is not required. Heavier loads may require a third or fourth set of jacking/lateral drive/rotational drive assemblies. The number of jacks required may be determined by the overall length of the pontoon, ground pressure requirements, and the load being lifted.

The pontoon (102) may comprise at least one tapered edge (121) at a lateral side wall for preventing the pontoon from catching on the ground.

In operation, the walker (100) is attached (for instance by welding) to a structure at the jacks (104 and 204), the longitudinal drive member (108), the lateral drive members (110, 112, 210, and 212), and the rotational drive members (114, 116, 214, and 216). The walker (100) may be attached directly to the structure or attached indirectly with one or more intermediate elements such as risers.

To move the structure over the ground, jacks (104) and (204) are engaged to bear the weight of the structure. The surface area of the pontoon (102) distributes the weight of the structure over the ground. The longitudinal drive member (108) is operated to move the structure longitudinally along the tracks (118 and 218). At this stage, the weight of the structure is borne by the walker (100) and the structure moves over the ground longitudinally relative to the stationary pontoon (102). Once the structure has moved a desired distance, the jacks (104 and 204) are disengaged and the structure is lowered to the ground. This can be thought of as the first "step" taken by the pontoon (102).

To advance the pontoon (102) for a second "step," the longitudinal drive member (108) is engaged to advance the pontoon (102) along the tracks (118 and 218). At this stage, the structure is resting on the ground and the pontoon (102) moves relative to the structure. Once the pontoon (102) has been advanced the desired distance, the jacks (104 and 204) are re-engaged and the structure is once again moved longitudinally over the ground.

When the structure needs to be moved in a direction that is not coincident with the longitudinal axis of the pontoon (102), the walker (100) can be rotated when the structure is resting on the ground. To rotate the walker (100), rotational drive members (114, 116, 214, and 216) are operated causing the rotational plate (122), rotational section of track, and the rollers (106) to turn to the desired angle to rotate over the pontoon (102) resulting in a change in longitudinal direction. The longitudinal drive member (108) may also center the rollers (106) over angular adjustments made by the rotational drive members (114, 116, 214, and 216).

To move the walker (100) laterally, lateral drive members (110 and 210) or lateral drive members (112 and 212) are operated, depending on which direction is desired, while the structure is resting on the ground. These lateral drive members (110 and 210; or 112 and 212) push the walker (102) away from the structure laterally.

To minimize wear over multiple traversals, the rollers (106 and 206) may roll along wear strips, such as a hardened steel wear strips.

It should be understood that numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A walker for moving a structure over the ground, the walker comprising:
   a pontoon for engaging the ground, the pontoon defining longitudinal and lateral directions;
   a jack with rollers disposed on the pontoon for lifting the structure;
   a longitudinal drive assembly disposed on the pontoon for longitudinally moving the pontoon relative to the jack with or without the structure on the rollers;
   a lateral drive assembly disposed on the pontoon for laterally moving the pontoon and the jack relative to the structure, when the structure is resting on the ground; and
   a rotational drive assembly disposed on the pontoon for rotationally moving the pontoon and the jack relative to the structure when the structure is resting on the ground;

wherein the rotational drive assembly comprises rotational drive members pivotally connected to the jack, for contacting the structure, for driving the rotational movement.

2. The walker of claim 1, wherein the longitudinal drive assembly comprises a longitudinal drive member pivotally connected to the pontoon and for pivotally connecting to the structure, for driving the longitudinal movement.

3. The walker of claim 2, wherein the longitudinal drive assembly further comprises a longitudinal track disposed on the pontoon, for guiding the longitudinal movement.

4. The walker of claim 1, wherein the lateral drive assembly comprises lateral drive members connected to the pontoon, for pushing on the structure for driving the lateral movement, the lateral drive members each comprising a roller for contacting the structure to guide the longitudinal and rotational movement.

5. The walker of claim 1, wherein the rotational drive assembly further comprises a retainer plate holding a rotational plate carrying the jack for guiding the rotational movement.

6. The walker of claim 1, wherein the longitudinal, lateral, and rotational drive assemblies are hydraulically driven and electronically controlled.

7. The walker of claim 1, wherein the pontoon comprises at least one tapered edge at a lateral side wall for preventing the pontoon from catching on the ground.

8. The walker of claim 1, further comprising:
a second jack;
a second lateral drive assembly; and
a second rotational drive assembly;
wherein the second lateral drive assembly and the second rotational drive assembly are disposed on the pontoon longitudinally spaced from the second jack.

9. The walker of claim 1, further comprising:
a second jack with rollers disposed on the pontoon for lifting the structure;
a second lateral drive assembly disposed on the pontoon for laterally moving the pontoon and the second jack relative to the structure, when the structure is resting on the ground; and
a second rotational drive assembly disposed on the pontoon for rotationally moving the pontoon and the second jack relative to the structure when the structure is resting on the ground, wherein the second rotational drive assembly comprises second rotational drive members pivotally connected to the second jack, for contacting the structure, for driving the rotational movement;
wherein the second lateral drive assembly and the second rotational drive assembly are disposed on the pontoon longitudinally spaced from the second jack.

* * * * *

UNITED STATES PATENT AND TRADEMARK OFFICE
CERTIFICATE OF CORRECTION

PATENT NO. : 9,580,122 B2
APPLICATION NO. : 14/708884
DATED : February 28, 2017
INVENTOR(S) : Benjamin Daniel Doherty Page 1 of 1

It is certified that error appears in the above-identified patent and that said Letters Patent is hereby corrected as shown below:

In the Specification

Detailed Description:

At Column 3, Line number 37, "The pontoon (102) may comprise at least one tapered edge (120) at a lateral side wall for preventing the pontoon from catching on the ground." should read: -- The pontoon (102) may comprise at least one tapered edge (121) at a lateral side wall for preventing the pontoon from catching on the ground. --.

At Column 3, Lines 56-58, delete "The pontoon (102) may comprise at least one tapered edge (121) at a lateral side wall for preventing the pontoon from catching on the ground." and replace with:
-- Multiple walkers (100) may be attached to a structure to provide stability to the structure as it is being moved. --.

Signed and Sealed this
Twenty-fourth Day of July, 2018

Andrei Iancu
*Director of the United States Patent and Trademark Office*